US006572471B1

(12) United States Patent
Bennett

(10) Patent No.: US 6,572,471 B1
(45) Date of Patent: Jun. 3, 2003

(54) SLOT MACHINE GAME—FIND THE PRIZE

(75) Inventor: Nicholas Luke Bennett, Manly Vale (AU)

(73) Assignee: Aristocrat Technologies Australia Pty, Ltd., Lane Cove (AU)

( * ) Notice: Subject to any disclaimer, the term of this patent is extended or adjusted under 35 U.S.C. 154(b) by 0 days.

(21) Appl. No.: 09/614,237

(22) Filed: Jul. 12, 2000

Related U.S. Application Data

(63) Continuation-in-part of application No. 08/991,899, filed on Dec. 17, 1997, now Pat. No. 6,102,798.

(30) Foreign Application Priority Data

Dec. 18, 1996 (AU) .............................................. PO4295

(51) Int. Cl.$^7$ ............................ A63F 13/00; A63F 1/18

(52) U.S. Cl. ......................................... 463/16; 273/139

(58) Field of Search .............................. 463/16–19, 20, 463/12, 13, 30, 31, 40, 42, 25, 37, 21–23, 26–27; 273/138.1, 139, 236, 237, 143 R

(56) References Cited

U.S. PATENT DOCUMENTS 5,411,271 A * 5/1995 Mirando ..................... 273/434
6,015,346 A * 1/2000 Bennett ....................... 463/20
6,039,648 A * 3/2000 Guinn et al. .................. 463/16
6,146,273 A * 11/2000 Olsen .......................... 463/27
6,174,235 B1 * 1/2001 Walker et al. ................ 463/25
6,261,177 B1 * 7/2001 Bennett ....................... 463/16

* cited by examiner

*Primary Examiner*—Kim Nguyen
(74) *Attorney, Agent, or Firm*—Katten Muchin Zavis Rosenman

(57) ABSTRACT

A slot machine is provided in a cabinet 10 including a prize display 12, a coin entry slot 13, a payout tray 14 and internally mounted game control processor circuits. The game display 11 comprises a video display screen ii controlled to display a game image divided into a matrix of elements or player selectable zones. The video screen is preferably of the touch sensitive variety, having an array of touch sensitive areas located on its display surface with one such area associated with each matrix element 40–75. The player may select one of the matrix elements (eg. 41) by touching the screen within the area of the respective element to be selected, thereby causing the image in the element to change to reveal whether or not a prize value is associated with that zone.

87 Claims, 11 Drawing Sheets

SLOT MACHINE GAME— FIND THE PRIZE

This is a continuation-in-part of U.S. patent application Ser. No. 08/991,899, filed Dec. 17, 1997 (now U.S. Pat. No. 6,102,798)

INTRODUCTION

The present invention relates to gaming machines of the type generally referred to as slot machines, fruit machines or poker machines, and in particular the invention provides a new game played on such a machine.

Players who regularly play gaming machines quickly tire of particular games and therefore it is necessary for manufacturers of these machines to come up with innovative games or game features that add interest to the games provided on such machines in order to keep the players amused and therefore willing to continue playing the game.

DESCRIPTION OF THE PRIOR ART

Gaming or poker machines have been well known in Australia, the state of Nevada, and many other jurisdictions for many years and have more recently gained considerable popularity throughout the world, with quite substantial amounts of money wagered on these machines. There is a growing tendency for State governments to legalise the use of gaming machines by licensing operators, with resulting revenue gains through licence fees and taxation of monies invested. The licensed operation of gaming machines is the subject of State legislation and regulation. This regulation most always dictates a minimum percentage payout for a gaming machine. For example, a minimum of 85% of monies invested must be returned as winnings, and manufacturers of gaming machines therefore must design their machines around these regulatory controls.

With the growth that has occurred in the gaming machine market there is intense competition between manufacturers to supply the various existing and new venues. When selecting a supplier of gaming machines, the operator of a venue will often pay close attention to the popularity of various games with their patrons.

Therefore, gaming machine manufacturers are keen to devise games which are popular with players, as a mechanism for improving sales.

In particular, manufacturers regularly devise new games which have not previously been seen on slot machines in order to stimulate renewal of player interest.

SUMMARY OF THE INVENTION

The present invention provides a slot machine including display means arranged to display a game being played on the machine, game initiating means to initiate a game on the machine and game control means responsive to the initiating means to control the playing of the game, characterised in that:

the display means is arranged to display a game image having a plurality of player selectable zones, the control means including player zone selection means, a prize being randomly associated with at least one of the zones such that if that zone is selected by a player the player will be awarded the associated prize, and the control means being arranged to randomly select zones of the plurality of zones one at a time and to indicate for each selected zone whether that zone has an associated prize, the random selection being continued by the control means until either, the player selects a zone, or all of the zones with associated prizes have been selected by the control means.

In various embodiments of the invention the background image for the game may be a static or dynamic image or an animation or fixed pattern. Alternatively there may be no significant background and each of the zones may be provided with its own graphic design.

In one embodiment, clues are provided to assist the player in determining the probability of a particular zone being the winning zone.

Preferably, the zone selection means includes touch sensors associated with the display means such that touching the display means within the area of one of the player selectable zones causes the respective zone to be selected. Preferably, the display means is a video screen or LCD panel and touch sensors are touch switches associated with zones of the display.

In some embodiments, the game image may display a sportsman playing his sport or a scene covering a hidden target. Examples include a golfer teeing off, a soccer player kicking a ball, a rugby player passing a ball, in which case a prize will be hidden in a zone where the ball might be expected to be found. Other examples include, an angler casting his fly, in which case the probable location of the fly will indicate the prize location, or a battleship dropping a depth charge or firing missiles, in which case the probable location of the target will indicate the prize. In each of these examples the screen image gives a clue to the player as to the zone having a prize associated with it. In other embodiments, clues may be permanently or temporarily revealed in zones that have been randomly selected by the control means or, alternatively clues might be permanently or temporarily displayed in unselected zones.

Prizes may be any of the types of awards commonly associated with gaming machines, including:

- a monetary amount;
- a multiplier amount that may be revealed indicating that a fixed prize from the basic game (for example the triggering game) may be multiplied by that amount;
- a predetermined number of free games that may be revealed (may also include a win multiplier to apply during those free games);
- a special symbol may that may be revealed to the player that will pay a bonus every time it appears for a predetermined number of games played (e.g. the next 50 games);
- a physical prize such as a car or a free meal, but can also include bonus games, bonus features in future games, or other benefits awarded to the player
- A progressive jackpot the value of which increments as a result of the machine being played or other machines in the system being played.

BRIEF DESCRIPTION OF THE DRAWINGS

Embodiments of the present invention will now be described by way of example with reference to the accompanying drawings in which.

DETAILED DESCRIPTION OF THE PREFERRED EMBODIMENTS

In the following detailed description, the methodology of the embodiments will be described and it is to be understood that it is within the capabilities of the non-inventive worker in the art to introduce the methodology on any standard microprocessor based gaming machine by means of appropriate programming.

Figure 1:
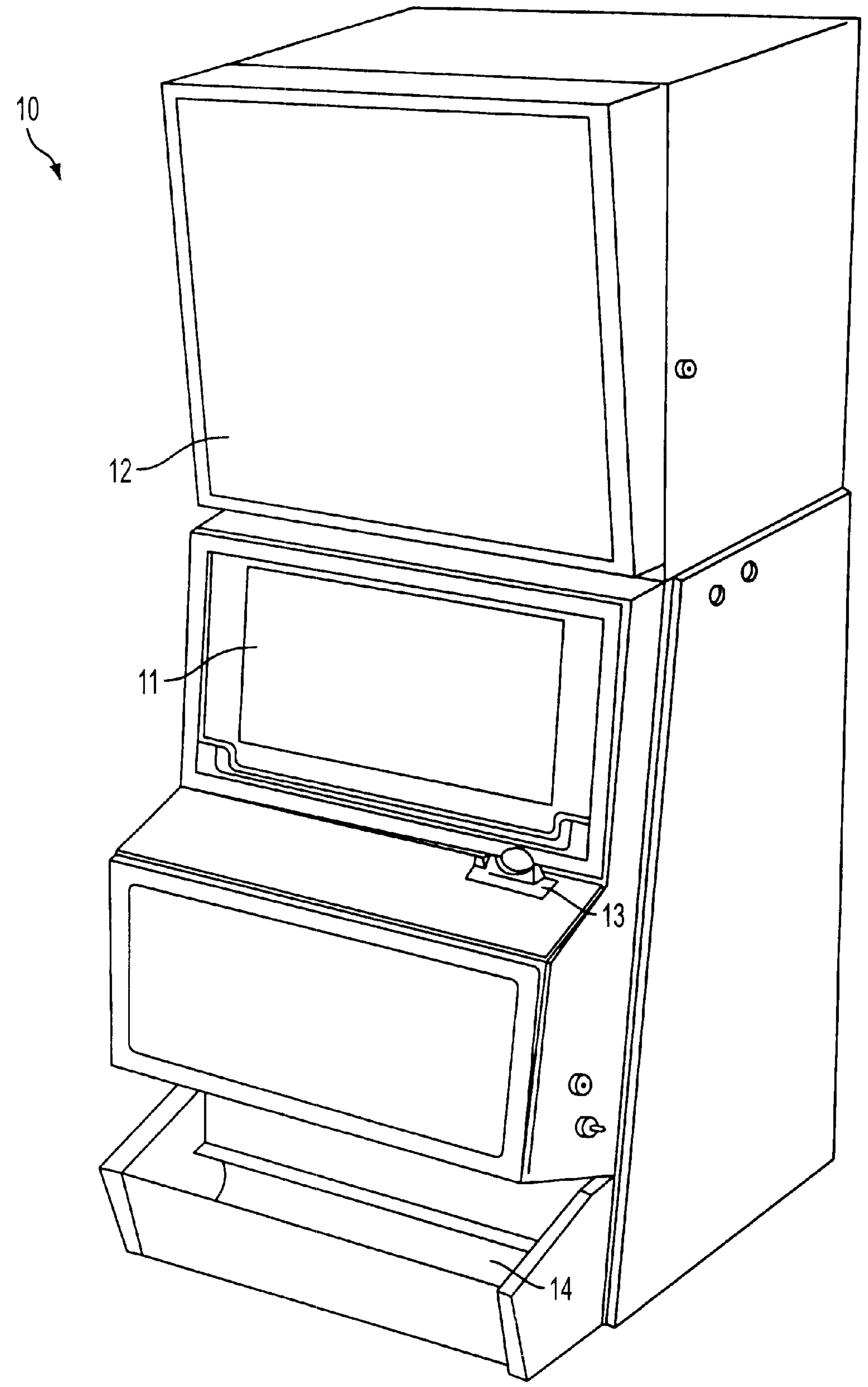
FIG. 1 illustrates a touch screen slot machine incorporating the present invention.
Figure 6:
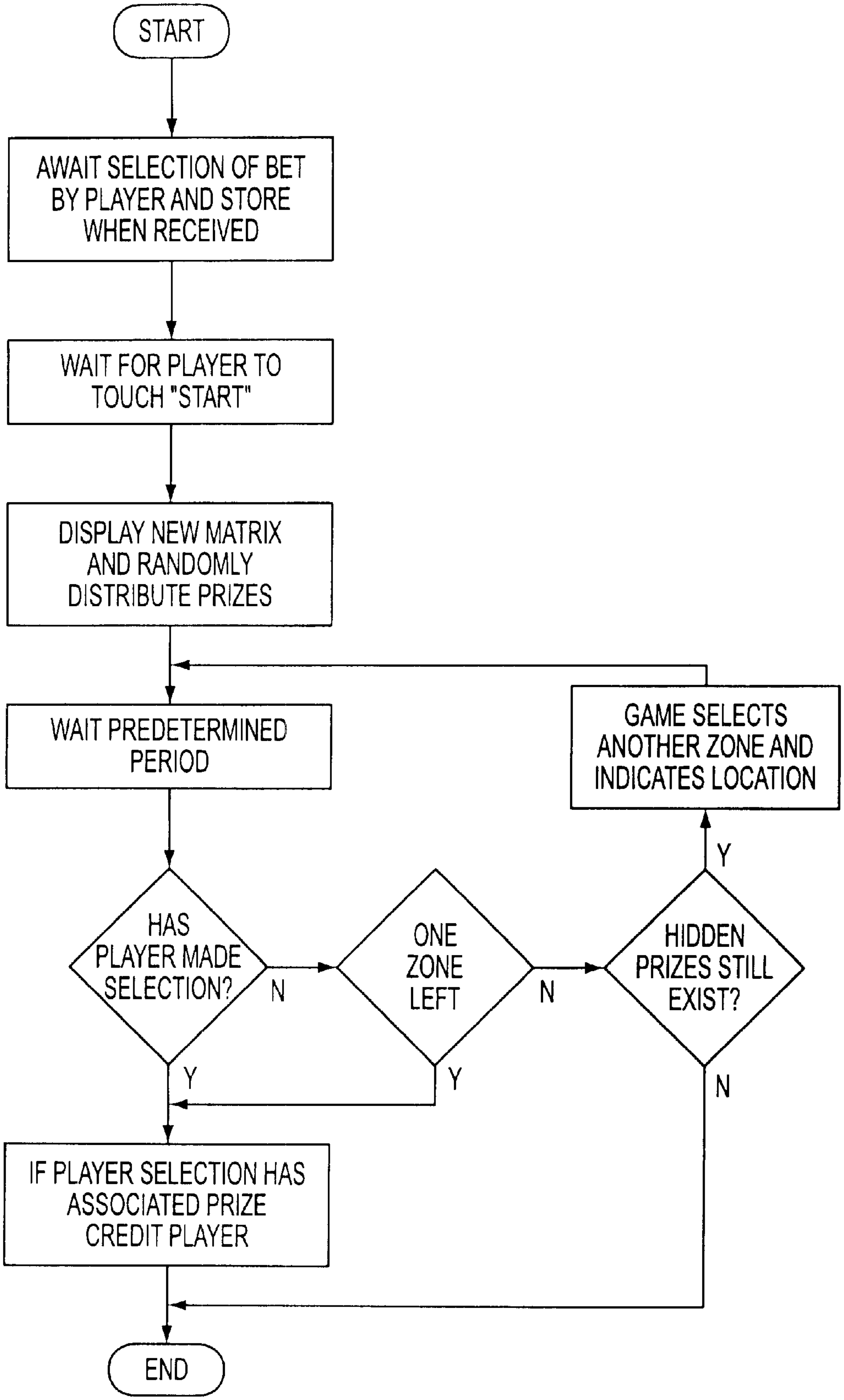
FIG. 6 is a flow chart showing operation of the game described with reference to FIG. 2.

Referring to FIG. 1, the illustrated embodiment of the invention is housed in a conventional slot machine cabinet 10 including a prize display 12, a coin entry slot 13, a payout tray 14 and internally mounted game control processor circuits (refer to FIG. 6).

Preferably, the game display means 11 comprises a video display screen 11 controlled to display a game image divided into a matrix of elements or player selectable zones. The video screen is preferably of the touch sensitive variety, having an array of touch sensitive areas located on its display surface with one such area associated with each matrix element 40–75 (refer to FIG. 2). The player may select one of the matrix elements (e.g. 41) by touching the screen within the area of the respective element to be selected, thereby causing the image in the element to change to reveal whether or not a prize value is associated with the zone. Additional player controls maybe implemented by displaying images 18, 19, 20, 21, 22, 23, corresponding to controls on the screen such that when the control images are touched, the associated function is caused to be performed.

Figure 2:
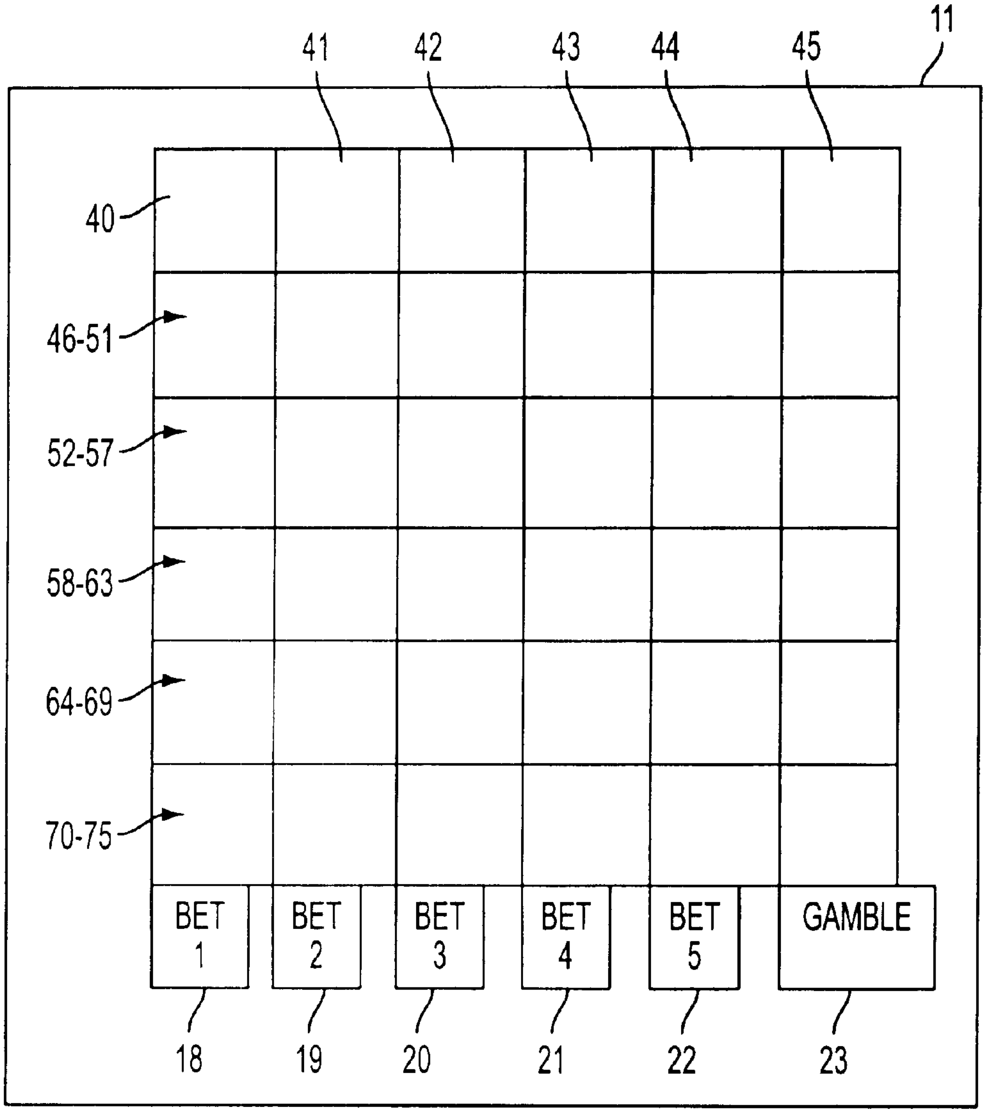
FIG. 2 illustrates a screen layout for an embodiment of the invention.

Referring to FIG. 2, a screen layout is illustrated for a first embodiment of the invention. In this embodiment, one such player control is a gamble button 23, which when touched causes a game to be initiated. Additionally, buttons 18, 19, 20, 21 and 22 enable bets of 1–5 credits to be placed on each game.

First the player selects his bet which will be deducted from his available credit when the game is commenced (and will cause the prize to be multiplied by the number of bet units selected). In some embodiments bet selection may not be provided and all bets will be of one unit or, alternatively, the game would be played as a feature or bonus game where the player is provided the opportunity to improve the prize won in the preceding main game.

After the player has selected his bet using buttons 18–22, if applicable, he starts the game by pressing the start button 23, and may then immediately select an image element by touching the appropriate screen position (eg. 49).

In the event that the player does not select a zone within a predetermined time (eg 3 seconds) the game will commence revealing zones randomly until all zones with associated prize values have been revealed. The game will reveal zones at a predetermined rate, of for example, one zone every 2 seconds. When each zone is selected, either by the player or the game, the selected zone will change state to indicate that it has been selected and remain in its new state until the end of the game. Also, if any selected zone has a prize associated with it, it will indicate the value of that prize. In the event that the game continues until there is only one unselected zone and the player still has not made a selection, the last zone will be automatically taken to the player selection; and by definition this zone must have a prize associated with it, otherwise the game would have already ended.

In the event that the zone selected by the player, or allocated to him has a prize associated with it, that prize (or its value) will be credited to the a player.

Figure 3:
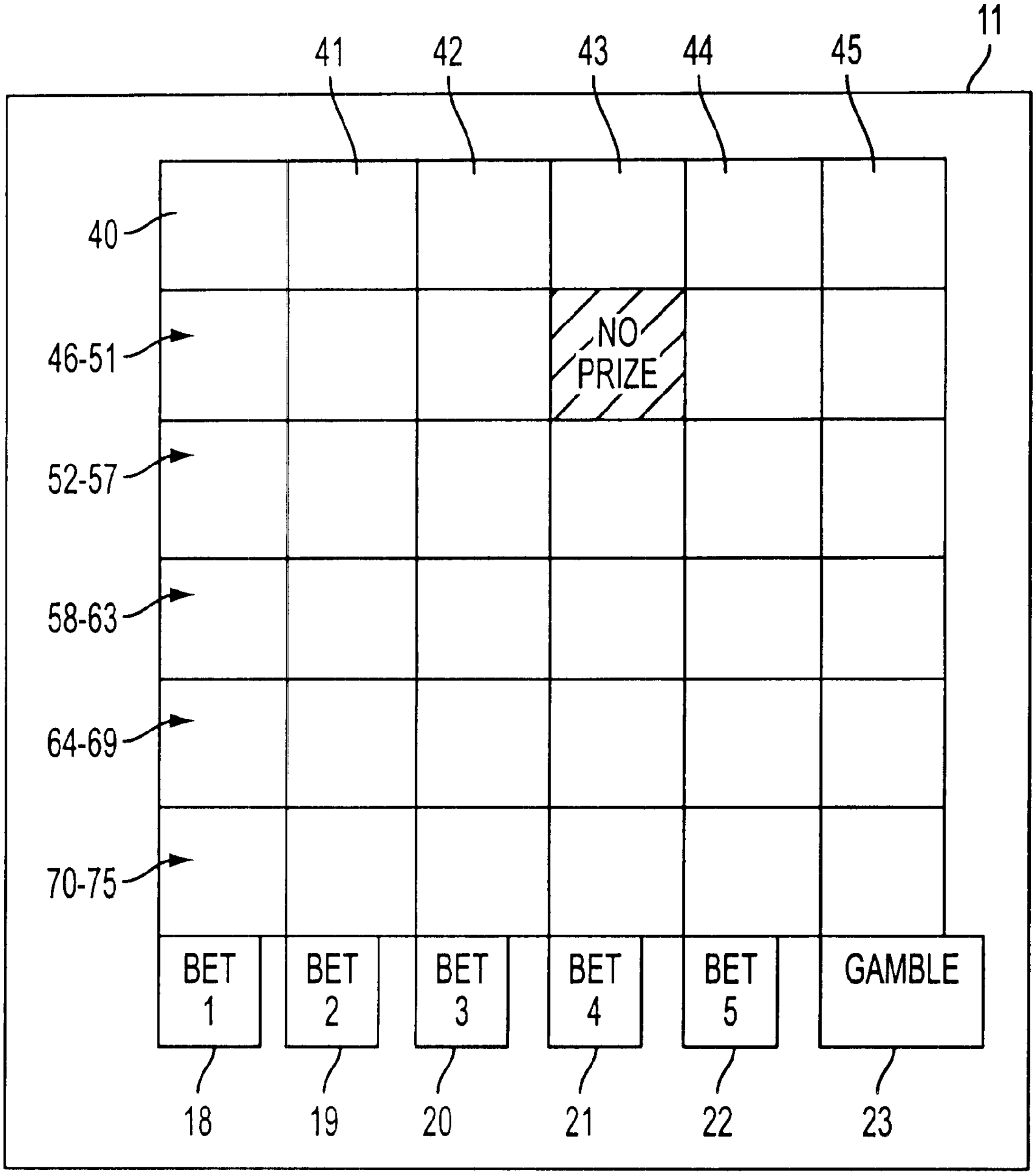
FIG. 3 illustrates the screen layout of FIG. 2 after a non-winning zone has been selected.
Figure 4:
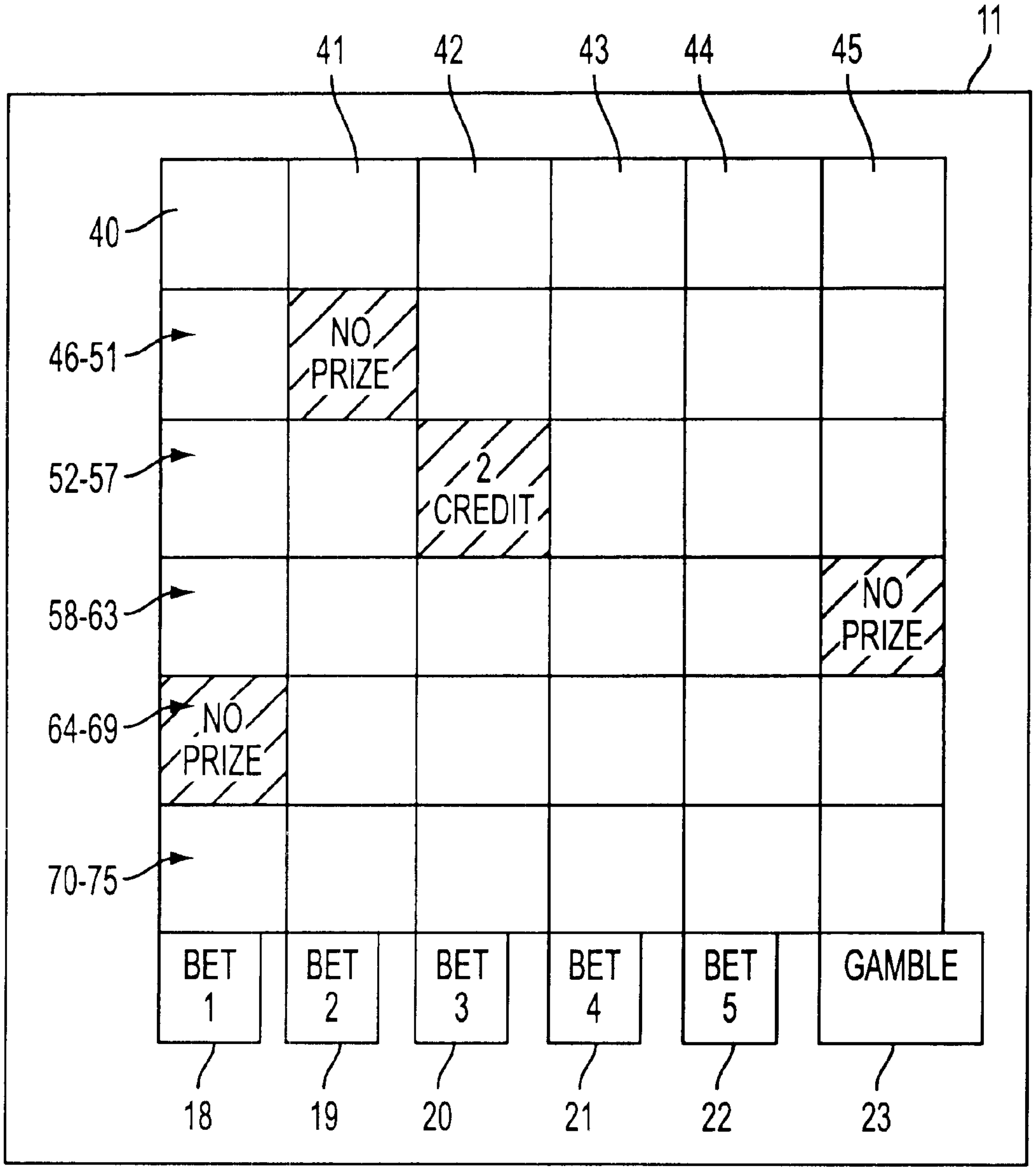
FIGS. 4 and 5 illustrate the screen layout of FIG. 2 after several zones have been selected by the machine.
Figure 5:
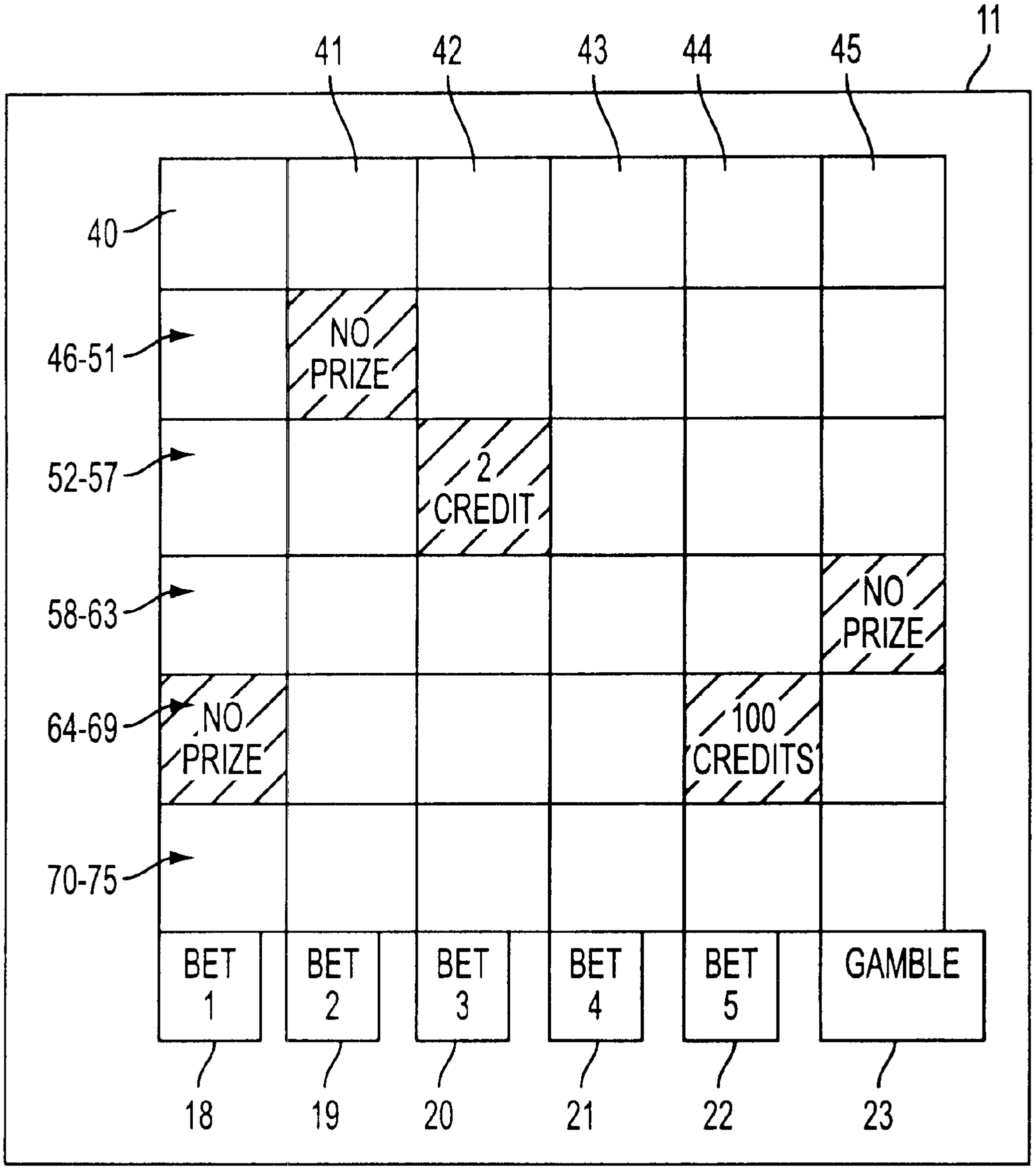

Referring to FIG. 3, the game of FIG. 2 is shown, when the player has selected a zone prior to the game making any selections. In this case zone 49 was selected and has revealed the message “no prize”. In some games, as the selection of zones by the slot machine progresses, the pattern of “prize” messages and “no prize” messages will provide clues to the player as to the location of other prizes, due to the expected layout of prizes. Referring to FIGS. 4 and 5, while the player does not make a selection the game selects zones periodically and, any associated prize indicia will be displayed (2 credits in the case of zone 54) to reveal a prize value. In the event that the player selects a zone associated with a prize, the prize is awarded to the player. The prize will be the value revealed (100 credits in the case of zone 68) multiplied by the number of credits bet, if appropriate.

Game selections and player selections are preferably indicated differently, for example by changing to different colours.

Referring to FIG. 6, a flow diagram is illustrated to show the logic of a control program which controls the operation of the game. From this diagram it will be noted that, after starting, the machine awaits selection of a bet by the player and the touching of the start button 23 to commence the game. The control program then causes the display of an image comprising a matrix of image elements or zones and randomly associates prizes with a predetermined number of displayed indicia. The game image may be the same for each game or may be a variation on the same theme with different backgrounds and orientations of characters etc. The game then waits a predetermined period and if the player has not made a selection the game tests that the number of unselected zones is greater than one and the number of hidden prizes is greater than zero and, if so, the game selects another zone. When the player makes a selection or if there is only one zone left unselected, the game checks to see if the player has won a prize and if so credits the player with the prize and the game ends. In the event that the player has not made a selection and there are no prizes remaining hidden the game also ends.

It will be appreciated that while the flow diagram of FIG. 6 shows a linear program sequence the testing for player selection may be occurring continuously by way of a hardware interrupt subroutine triggered either by a timer or an input detection circuit, in which case the input testing step may occur at any point in the loop. This alternative arrangement is illustrated in the flow diagram of FIG. 7.

Figure 7:
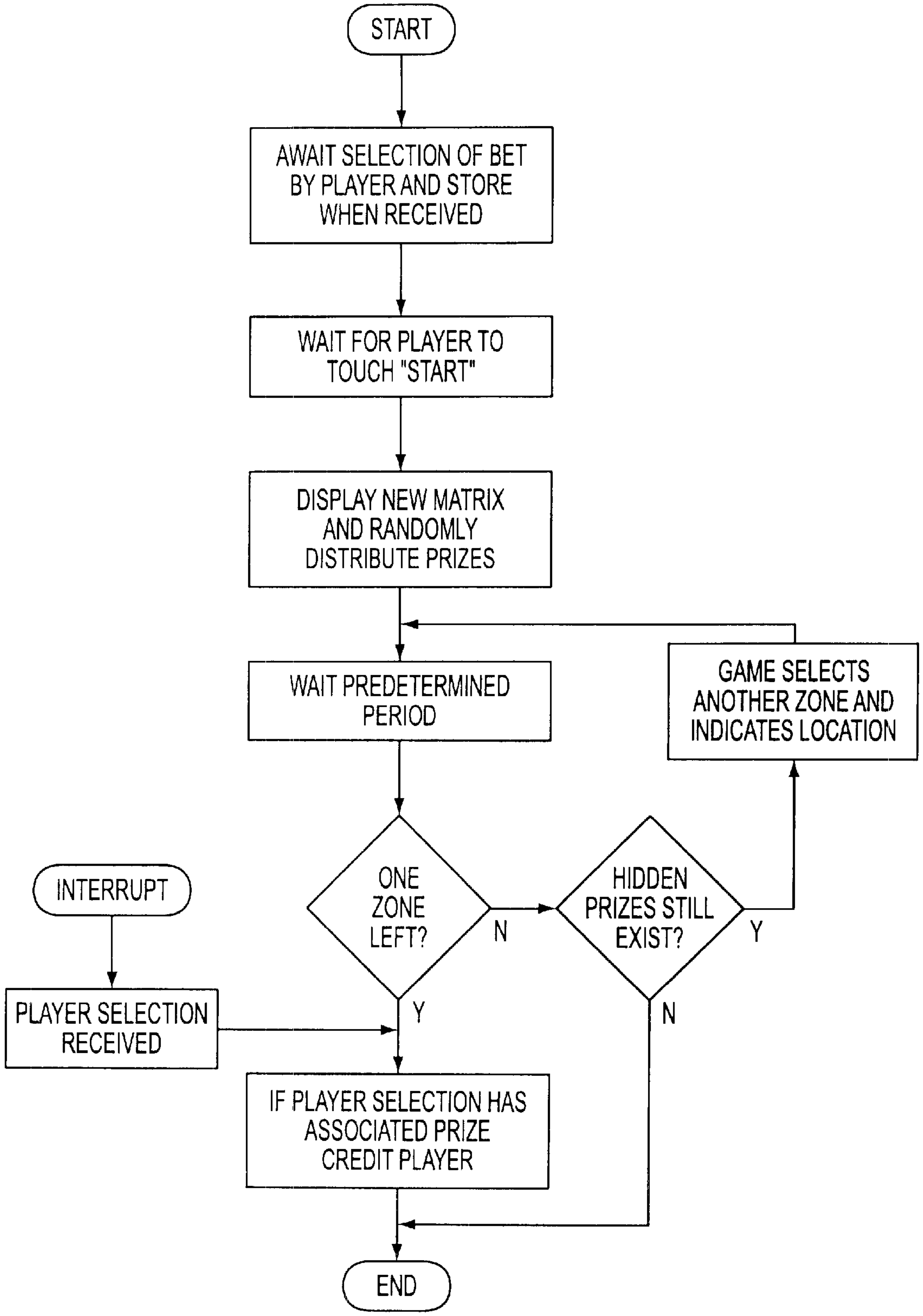
FIG. 7 is a flow chart showing an alternative operation of the game to that illustrated in FIG. 6.
Figure 8:
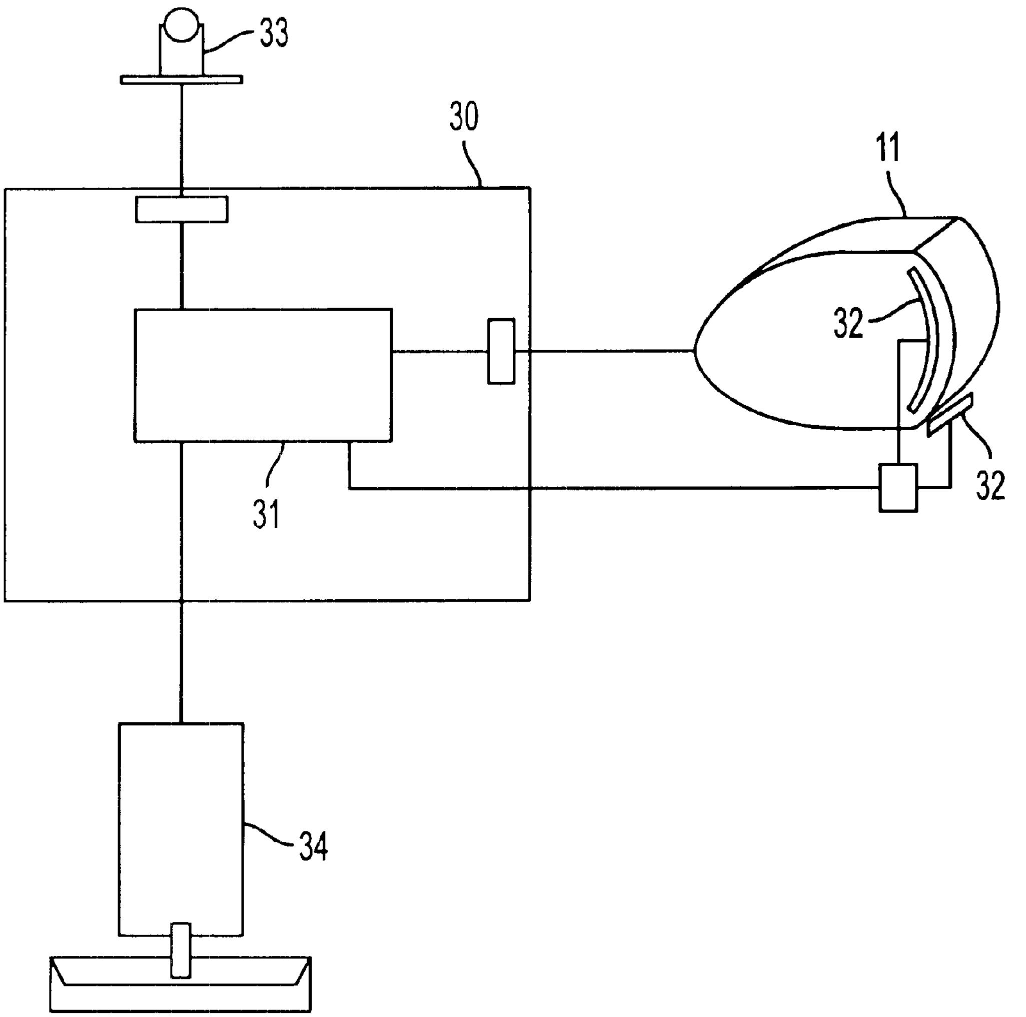
FIG. 8 is a schematic diagram of a slot machine control circuit.

The program to implement the sequence of FIGS. 6 or 7 runs on a standard gaming machine control processor 31 as illustrated schematically in FIG. 8. This processor forms part of a controller 30 which drives the display screen 11 and receives touch input signals from touch sensors 32 as well as receiving coin input pulses from a coin chute mechanism 33 and driving a coin payout mechanism 34.

In a further embodiment of the invention, the game does not end when a player makes their selection. Instead, the player is given two (or possibly more) selections and can potentially win more than one prize. In one embodiment, the player may make 2 selections before the game ends with the game ending when the player makes his second selection, or when the number of remaining selections available to the player is equal to the number of elements remaining available to be selected. However, games could be configured to allow the player larger numbers of selections than one or two.

While the above description envisages the system revealing matrix elements one at a time until the player makes a selection, it is also possible to provide a feature where either the player or the machine may reveal matrix elements a number at a time. For example, a player may 'win' eligibility to a higher level of the game in which he may select multiple elements simultaneously. This could be done by the player touching a primary element and one or more adjacent elements to the primary element being selected as well. The adjacent elements would be in a predefined relationship with the primary element, for example the element to the immediate right of the primary could be associated with the primary element if the player was awarded a level where 2 symbols are revealed at a time and the elements to the immediate right and left if the player was awarded a level where 3 symbols are revealed at a time, etc.

The game may also include playing levels where the machine selects multiple elements thereby encouraging the player to play faster.

Figure 9:
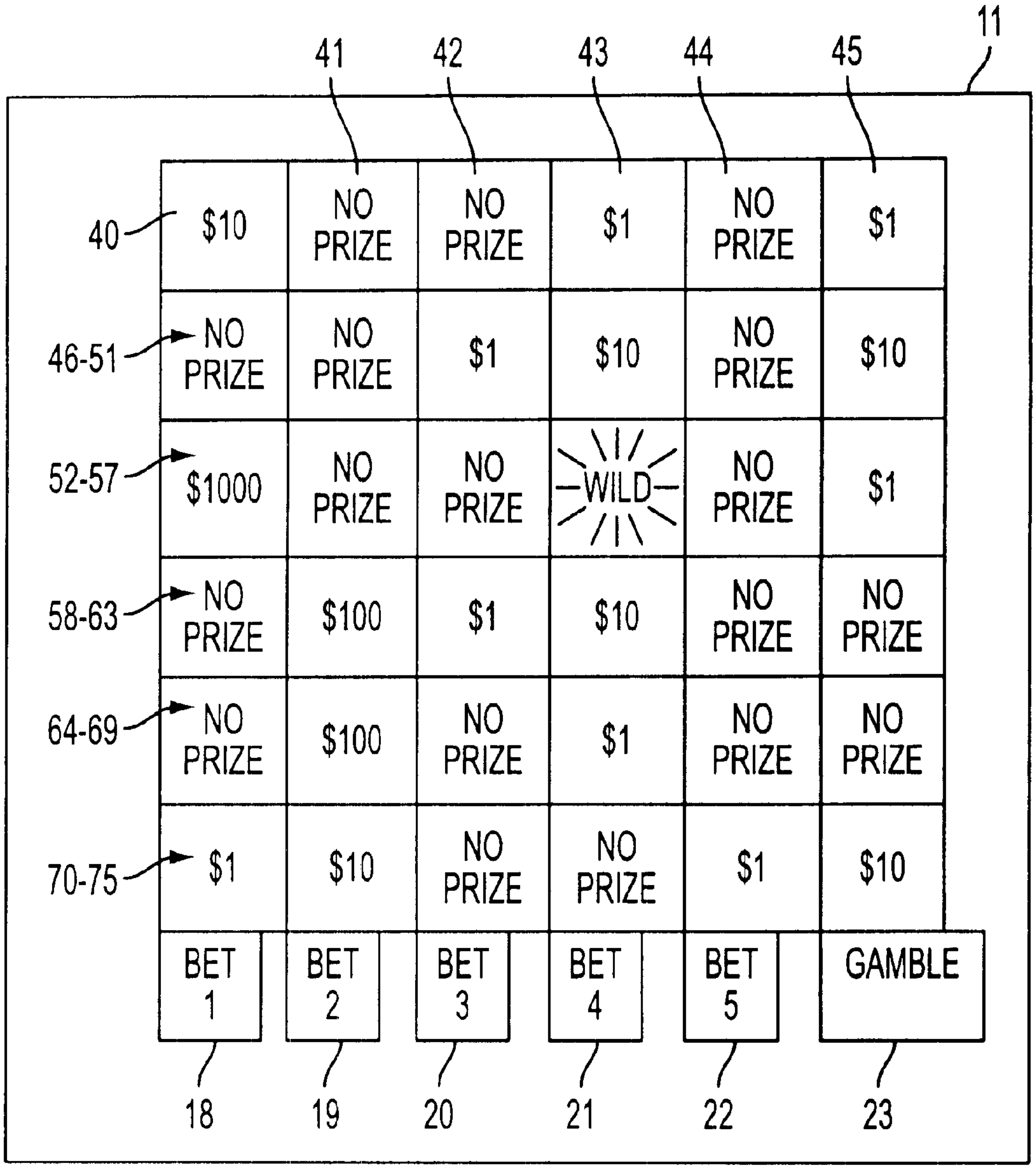
FIG. 9 illustrates a game screen for a match the prize game, incorporated into an embodiment of the present invention.

Referring to FIG. 9, a game screen is illustrated for a game that may be played on a gaming machine according to the present invention.

This screen shows a plurality of matrix elements 40–75, with which a variety of prize values (including no prize or zero values) are associated. When a game commences, these prize values would be hidden and perhaps a graphic design of some kind displayed over the top. The graphic design may have no bearing on the location of any of the prize values, or could provide clues to the location of some or all of the prize values as in the case of the FIG. 10 example of an image of a football field with players engaged in a football game.

Figure 10:
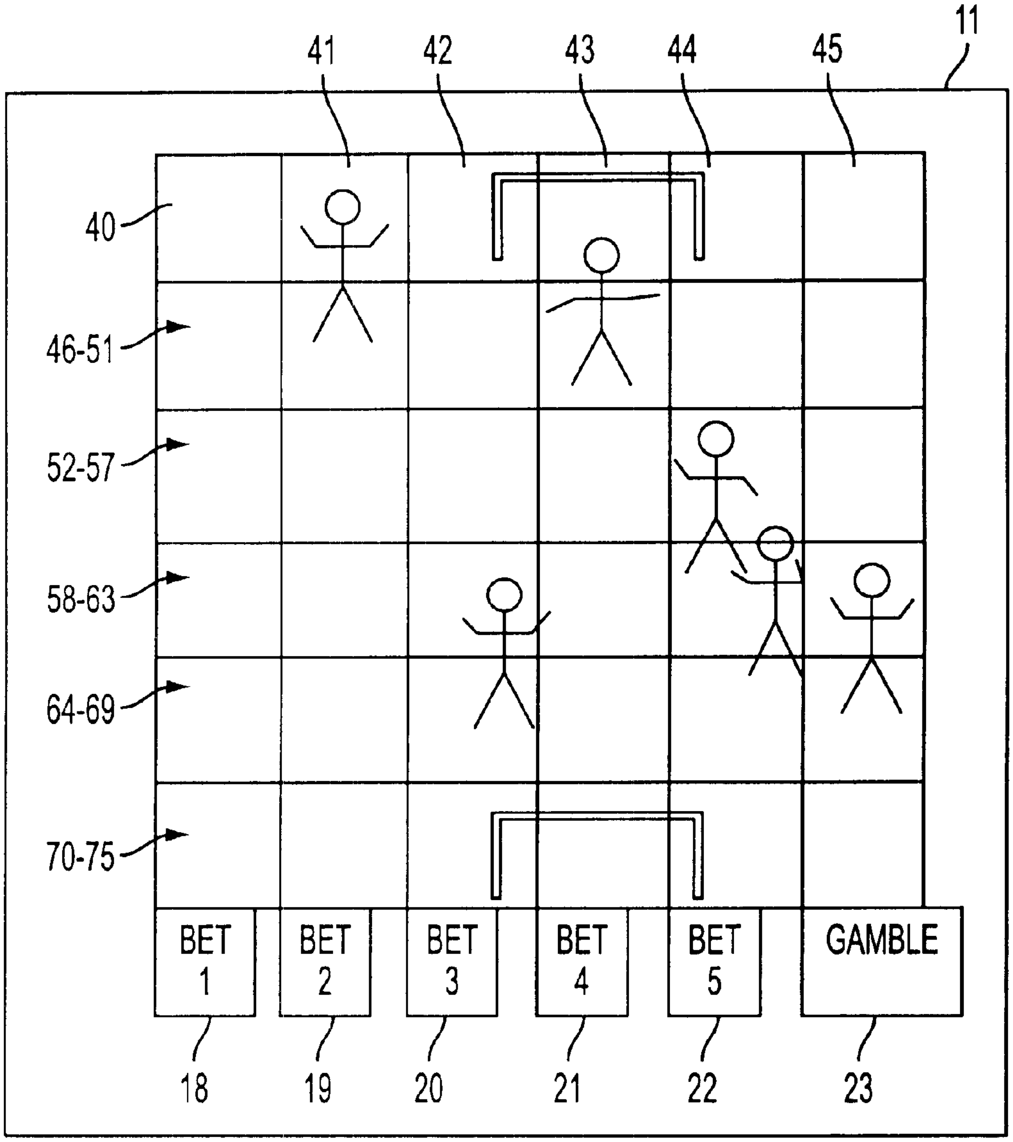
FIG. 10 is a screen graphic displayed to hide the game screen of FIG. 9 at the commencement of a game.

In the example of FIG. 10, the concentration of football players around element 61 might give a clue to the location of the 'wild' indicia located there for example by suggesting that the unillustrated ball of the football game would be located there.

In this game, a prize could be paid for the first element with an associated prize value selected by the player as previously described. Alternatively, the game could require the player to select two matching elements with each having the same prize value, or a wild symbol and one element with a prize value. The elements selected if non-winning (ie, non-matching) can either be re-hidden by re-displaying the overlying graphic or could remain revealed, in which case prize values revealed will be no-longer available for matching with newly selected elements. The gaming machine can progressively reveal elements as well, either one at a time, or in groups of two or more, thereby removing those elements from the set from which the player may select.

The game can either end when the player selects a matching pair or, when there are no more pairs to select. Alternatively, the game may continue after the player makes a first match, such that he has an opportunity of winning more than one prize per game.

If the elements are re-hidden after each non-winning player selection, the game may terminate when all of the elements have been revealed either by the player or the machine.

Figure 11:
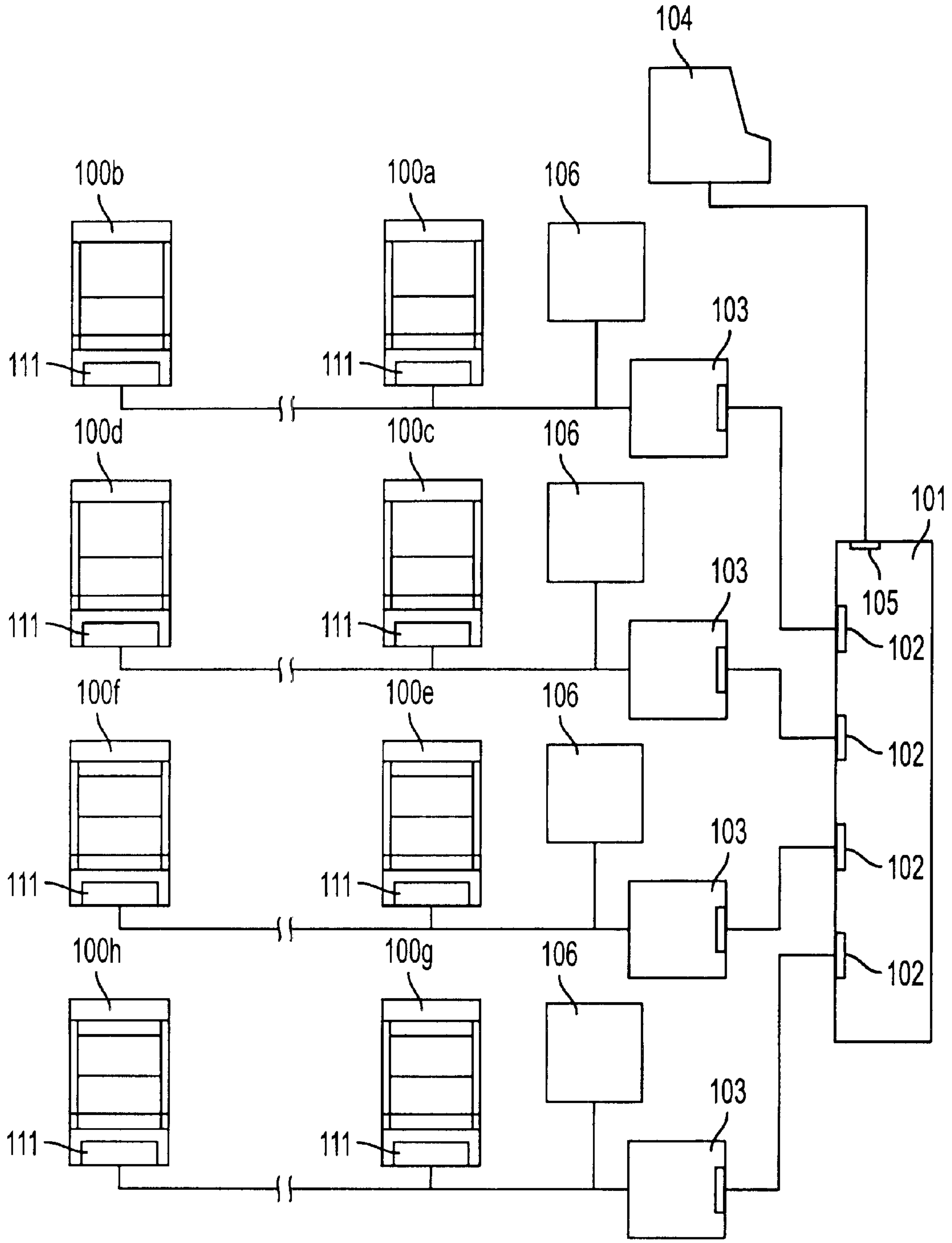
FIG. 11 is a block diagram of a system of gaming machines arranged to play for system prizes, or jackpots, or bonuses, or to participate in tournaments against the system controller or other gaming machines in the system.

The game of the present invention may also be played as a tournament against other players. In this case referring to FIG. 11, the gaming machines 100*g*–100*h* in an installation will be connected to a controller 101 and in the illustrated embodiment this is done via bank controllers 103. The controllers 101 may be connected to an operator terminal 104 or other system components such as accounting systems and other jackpot controllers. Each set of machines (eg, 100*a*–100*b*) connected to a bank controller 103 may also be connected to a central display 106 associated with that bank for displaying information relating to that bank of machines or information relating to the gaming machine installation in general. When a tournament game is played the game, or the results, or the progress of the game may be displayed on the respective central display 106.

Tournaments may be played on just one bank, plurality of banks or the whole gaming machine installation, however it is preferable if the number of machines in the tournament is less than or equal to the number of player selectable elements in the game.

When a tournament commences all of the machines participating will display a common game which may also be displayed on the bank display. The tournament controller 101 will send signals to the participating machines 100 and bank displays 106 when a tournament is about to commence indicating that they should display the tournament game screen (eg, the screen controller of FIG. 101) at the end of the next game cycle. When all of the machines report that they have displayed the tournament screen, the controller will wait briefly to give the player on the last machine to report in, time to realize that a tournament is about to commence and then a signal will be issued to commence the tournament. The participating machines, when they receive this signal, will indicate to their respective players to commence playing and the players should then commence selecting elements. Elements selected by each player will be revealed to all other players in the tournament and progress will also be displayed on the outside display. In the preferred embodiment each player gets only one selection and the tournament will ran until one player wins a prize.

The object of the tournament feature is for each eligible player to play directly against each other player in the tournament. Hence, when the tournament is triggered during play of the base slot game, the same feature game will be displayed on every participating machine. When one player selects a location, then that same location will be marked off on every participating machine's screen. This adds to the suspense of the feature since the players can watch the elements being progressively revealed. For each element that is revealed and does not uncover the bonus prize they will have a greater chance of selecting the bonus themselves (since the number of elements to choose from has been reduced). However, the longer they wait the more they increase the chance of someone else selecting the bonus prize first. If a bonus does not get revealed during a tournament it will be carried over to be included in the next tournament.

There are several different ways that the tournament may operate. For example:

- Multiple prizes may be arranged among the elements where at least one is a bonus prize such as a progressive jackpot. Some elements may contain no prize, or each element may have at least a consolation prize. Each participant will get exactly one selection, and will be given the prize (if applicable) that relates to the element that they select.

There may be just one bonus (eg. progressive jackpot) prize. Each player will be allowed a maximum of one selection, but the feature will be over as soon as the bonus has been revealed. Hence, participants who have not made a selection at the time that the bonus is revealed will forfeit their chance to make a selection.

As for previous embodiments, but in addition, the controller may randomly reveal elements in addition to the elements selected by the various players.

For embodiments where there may be more participants than elements to choose from, or where the controller may reveal elements, player selections may operate on a "first-in-first-served" basis. Hence, if players aren't quick enough they will miss out on the opportunity to make a selection.

As for previous embodiments, but where the players may be allowed to make more than one selection (eg. exactly 2 selections, or a number of selections that is weighted by the size of the bet on the game being played when the tournament was triggered). The additional selections may have to be made in order (ie a player cannot make a second choice until everyone has made a first choice), or alternatively, the selections might be made whenever the player chooses.

As well as, (or instead of) the prizes being revealed on each participant's screen as other participants make selections, the number of the gaming machine applicable to each selection may be revealed on the participants' screens for each element.

In another embodiment a similar tournament feature game is provided on a multi-station terminal. In this case the feature game will operate in a similar manner to the tournament described above, except that there will be one central screen around which the players are located and from which they all choose their zone selections. Preferably it will be a large touchscreen in the centre of a ring of players such that the players can all touch any point on the screen as necessary. All players will select a zone on the screen from the same screen. Preferably this is implemented such that the players each choose in order (eg. clockwise from the first player position or terminal) so that the machine can recognise which player chose which location.

When a player wins the tournament, the location of the winning machine, the prize and other celebratory images will be displayed on the control display 106 and the winning machine 100 will play by a win time.

It will also be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A gaming system comprising:

a plurality of gaming machines connected to a tournament controller and each gaming machine comprising:

display means arranged to display a game being played on the gaming machine;

initiating means to initiate the game on the gaming machine;

game control means responsive to the game initiating means to control the playing of the game, wherein:

the display means is arranged to display at least one game image or game images having a plurality of player selectable zones;

the control means includes player zone selection means;

a prize being randomly associated with at least one of the player selectable zones, the prize being hidden from the player until the respective player selectable zone is selected, such that if that player selectable zone is selected by the player after the game image is displayed, the gaming machine will indicate to the tournament controller a winning condition, wherein the tournament controller is arranged to initiate a tournament to be played simultaneously on at least two participating gaming machines of the plurality of gaming machines, and monitors the selections of the players of each of the participating gaming machines and substantially simultaneously advises each participating gaming machine of the selections made on each other participating gaming machine, and wherein the game control means of each participating gaming machine reveals selections made by the player of the respective gaming machine and the players of the other participating gaming machines whereby selected zones are removed from player selectable the set of zones available to the player of a gaming machine for selection if already selected by the player of another participating gaming machine and when one or more gaming machines indicate to the tournament controller that a winning condition has occurred, the tournament controller will select the gaming machine that first achieved the winning condition, award a prize to the selected gaming machine and end the tournament.

2. The gaming system of claim 1, wherein at least two zones of a gaming machine are associated with one another and if the player selects two associated zones, a winning condition is indicated to the tournament controller and each player of each participating gaming machine is awarded two selections per game.

3. The gaming system of claim 1, wherein the player of each participating gaming machine is awarded only one selection opportunity per game.

4. The gaming system of claim 3, wherein the display means displays a background image of the game image for the game which is a static image.

5. The gaming system of claim 4, wherein the background image is a fixed. pattern.

6. The gaming system of claim 3, wherein the display means displays a background image of the game image for the game which is a dynamic image.

7. The gaming system of claim 6, wherein the background image is an animation.

8. The gaming system as claimed in any one of claims 4 or 6, wherein the game image is an image of a golfer teeing off, such that the game image gives a clue to the player as to the zone having a prize associated with it.

9. The gaming system as claimed in any one of claims 4 or 6, wherein the game image is an image of a football player kicking a ball, such that the game image gives a clue to the player as to the zone having a prize associated with it.

10. The gaming system as claimed in any one of claims 4 or 6, wherein the game image is an image of a rugby player passing a ball, such that the game image gives a clue to the player as to the zone having a prize associated with it.

11. The gaming system as claimed in any one of claims 4 or 6, wherein the game image is an image of an angler casting a fly, such that the game image gives a clue to the player as to the zone having a prize associated with it.

12. The gaming system as claimed in any one of claims 4 or 6, wherein the game image is an image of a battleship dropping depth charges, such that the game image gives a clue to the player as to the zone having a prize associated with it.

13. The gaming system as claimed in any one of claims 4 or 6, wherein the game image is an image of a battleship firing missiles, such that the game image gives a clue to the player as to the zone having a prize associated with it.

14. The gaming system of claim 3, wherein the display means displays a matrix of zone images which form the game image.

15. The gaming system of claim 14, wherein each zone image has a static image.

16. The gaming system of claim 14, wherein each zone image is a fixed pattern.

17. The gaming system of claim 14, wherein each zone image is a dynamic image.

18. The gaming system of claim 17, wherein each zone image is an animation.

19. The gaming system as claimed in claim 3, wherein clues the player selectable zones having associated prizes are permanently or temporarily revealed in zones that have been randomly selected by the game control means.

20. The gaining system as claimed in claim 3, wherein clues to the player selectable zones having associated prizes are permanently or temporarily displayed in unselected zones.

21. The gaming system if claim 3, wherein the display means is a video screen; and the control means includes player zone selection means including touch sensors associated with the display means and located such that touching the display means within one of the player selectable zones causes the respective player selectable zone to be selected.

22. The gaming system of claim 21, wherein the display image or images provide clues as to the probability of each player selectable zone having an associated prize.

23. The gaming system of claim 22, wherein the display image is an image of a golfer teeing off, such that the screen image gives a clue to the player as to the player selectable zone having a prize associated with it.

24. The gaming system of claim 22, wherein the display image is an image of a football player kicking a ball, such that the screen image gives a clue to the player as to the player selectable zone having a prize associated with it.

25. The gaming system of claim 22, wherein the display image is an image of a rugby player passing a ball, such that the screen image gives a clue to the player as to the player selectable zone having a prize associated with it.

26. The gaming system of claim 22, wherein the display image is an image of an angler casting a fly, such that the screen image gives a clue to the player as to the player selectable zone having a prize associated with it.

27. The gaming system of claim 22, wherein the display image is an image of a battleship dropping depth charges, such that the screen image gives a clue to the player as to the player selectable zone having a prize associated with it.

28. The gaming system of claim 22, wherein the display image is an image of a battleship firing missiles, such that the screen image gives a clue to the player as to the player selectable zone having a prize associated with it.

29. The gaming system of claim 21, wherein clues to player selectable zones having associated prizes are displayed in unselected zones.

30. The gaming system of claim 3, wherein the display means is an LCD panel and is arranged to display the game image having a plurality of player selectable zones;

the control means includes player zone selection means includes touch sensors associated with the display means and located such that touching the display means within one of the player selectable zones causes the respective zone to be selected.

31. The gaming system of claim 21 or 30, wherein the display means displays a background image for the game which is a static image.

32. The gaming system of claim 21 or 30, wherein the image is a fixed pattern.

33. The gaming system of claim 21 or 30, wherein the display means displays a background image for the game which is a dynamic image.

34. The gaming system of claim 21 or 30, wherein the game image is an animation.

35. The gaming system of claim 21 or 30, wherein the display means displays a matrix of zone images.

36. The gaming system of claim 21 or 30, wherein each zone image has a static image.

37. The gaming system of claim 21 or 30, wherein each zone image is a fixed pattern.

38. The gaming system of claim 21 or 30, wherein each zone image is a dynamic image.

39. The gaming system of claim 21 or 30, wherein each zone image is an animation.

40. The gaming system of claim 1, wherein the player of each participating gaming machine is awarded only one selection opportunity per game.

41. A gaming system comprising:

a plurality of gaming machines connected to a tournament controller and each gaming machine comprising:

display means arranged to display a game being played on the gaming machine;

game initiating means to initiate a game on the gaming machine;

game control means responsive to the initiating means to control the playing of the game, wherein:

the display means is arranged to display at least one game image or game images having a plurality of player selectable zones;

the game control means includes player zone selection means;

a prize being randomly associated with at least one of the player selectable zones, the prize being hidden from the player until the respective player selectable zone is selected, such that if that player selectable zone is selected by a player after the image is displayed, the gaming machine will indicate to the tournament controller a winning condition, wherein the tournament controller is arranged to initiate a tournament to be played simultaneously on at least two participating gaming machines of the plurality of gaming machines and randomly selects zones of the plurality of zones while the games are in progress and instructs the game control means of each participating gaming machine to substantially simultaneously reveal the tournament controller selected zones and to indicate to the player for each tournament controller selected zone whether that zone has an associated prize, thereby removing the tournament controller selected zones from the player selectable zones of a participating machine, the random selection being continued by the control means until either, the player of each participating machine has selected a zone, or all of the zones with associated prizes have been selected, and when one or more machines indicate to the tournament controller that a winning condition has occurred, the tournament controller will select the machine that first achieved the winning condition, award a prize to the selected machine and end the tournament.

42. The gaming system of claim 41, wherein the control means selects the player controllable zones one at a time.

43. The gaming system of claim 41, wherein the control means selects a plurality of player selectable zones at one time.

44. A gaming system comprising:

a plurality of gaming machines connected to a tournament controller and each gaming machine comprising:

display means arranged to display a game being played on the gaming machine;

game initiating means to initiate a game on the gaming machine;

game control means responsive to the gaming initiating means to control the playing of the game, wherein:

the display means is arranged to display at least one game image or game images having a plurality of player selectable zones;

the game control means includes player zone selection means;

a plurality of prizes being randomly associated with the player selectable zones, each prize being associated with a different one of the player selectable zones and each prize being hidden from a player until the respective zone is selected, such that if that zone is selected by the player after the game image is displayed, the gaming machine will indicate to the tournament controller a winning condition, wherein the tournament controller is arranged to initiate a tournament to be played simultaneously on at least two participating gaming machines of the plurality of gaming machines and wherein the tournament controller monitors selections of the players of each of the participating gaming machines and substantially simultaneously advises each participating gaming machine of the selections made on each other participating gaming machine, and the game control means of each participating gaming machine reveals the selections made by the player of the respective gaming machine and the players of the other participating gaming machines whereby the selected player selectable zones are removed from the player selectable set of zones available to the player of a gaining machine for selection if already selected by the player of another participating gaming machine.

45. The gaming system of claim 44, wherein the player of each participating machine is awarded more than one selection per game.

46. The gaming system of claim 45, wherein each player may continue selecting until there are no player selectable zones remaining to be selected.

47. The gaming system of claim 44, wherein the tournament controller randomly selects player selectable zones of the plurality of player selectable zones and instructs the game control means of each participating gaming machine to substantially simultaneously reveal the randomly selected player selectable zones, thereby removing the tournament controller selected zones from the player selectable zones of a participating machine, and to indicate to the player for each selected zone whether that player selectable zone has an associated prize, the random selection being continued by the control means until either, the player of each participating machine has selected a player selectable zone, or all of the player selectable zones with associated prizes have been selected.

48. The gaming system of claim 47, wherein the game control means selects zones one at a time.

49. The gaming system of claim 47, wherein the control means selects a plurality of zones at one time.

50. The gaming system of claim 44, wherein at least two zones of a gaming machine are associated with one another and if the player selects two associated player selectable zones, a winning condition is indicated to the tournament controller and each player of each participating gaming machine is awarded two selections per game.

51. The gaming system of claim 44, wherein the display means displays a background image of the game image for the game which is a static image.

52. The gaming system of claim 51, wherein the background image is a fixed pattern.

53. The gaming system of claim 44, wherein the display means displays a background image of the game image for the game which is a dynamic image.

54. The gaming system of claim 53, wherein the background image is an animation.

55. The gaming system as claimed in any one of claims 51 or 53, wherein the game image is an image of a golfer teeing off, such that the game image gives a clue to the player as to the zone having a prize associated with it.

56. The gaming system as claimed in any one of claims 51 or 53, wherein the game image is an image of a football player kicking a ball, such that the game image gives a clue to the player as to the zone having a prize associated with it.

57. The gaming system as claimed in any one of claims 51 or 53, wherein the game image is an image of a rugby player passing a ball, such that the game image gives a clue to the player as to the zone having a prize associated with it.

58. The gaming system as claimed in any one of claims 51 or 53, wherein the game image is an image of an angler casting a fly, such that the game image gives a clue to the player as to the zone having a prize associated with it.

59. The gaming system as claimed in any one of claims 51 or 53, wherein the game image is an image of a battleship dropping depth charges, such that the game image gives a clue to the player as to the player selectable zone having a prize associated with it.

60. The gaming system as claimed in any one of claims 51 or 53, wherein the game image is an image of a battleship firing missiles, such that the game image gives a clue to the player as to the zone having a prize associated with it.

61. The gaming system of claim 44, wherein the display means displays a matrix of zone images which form the game image.

62. The gaming system of claim 61, wherein each zone image has a static image.

63. The gaming system of claim 61, wherein each zone image is a fixed pattern.

64. The gaming system of claim 61, wherein each zone image is a dynamic image.

65. The gaming system of claim 64, wherein each zone image is an animation.

66. The gaming system as claimed in claim 45, wherein clues to player selectable zones having associated prizes are permanently or temporarily revealed in zones that have been randomly selected by the game control means.

67. The gaming system as claimed in claim 44, wherein clues to player selectable zones having associated prizes are permanently or temporarily displayed in unselected zones.

68. The gaming system if claim 44, wherein the display means is a video screen; and the control means includes player zone selection means including touch sensors associated with the display means and located such that touching the display means within one of the player selectable zones causes the respective zone to be selected.

69. The gaming system of claim 68, wherein the display means displays a matrix of zone images.

70. The gaming system of claim 68, wherein each zone image has a static image.

71. The gaming system of claim 68, wherein each zone image is a fixed pattern.

72. The gaming system of claim 68, wherein each zone image is a dynamic image.

73. The gaming system of claim 68, wherein each zone image is an animation.

74. The gaming system of claim 68, wherein the display image or images provide clues as to the probability of each player selectable zone having an associated prize.

75. The gaming system of claim 74, wherein the display image is an image of a golfer teeing off, such that the screen images gives a clue to the player as to the zone having a prize associated with it.

76. The gaming system of claim 74, wherein the display image is an image of a football player kicking a ball, such that the screen image gives a clue to the player as to the player selectable zone having a prize associated with it.

77. The gaming system of claim 74, wherein the display image is an image of a rugby player passing a ball, such that the screen image gives a clue to the player as to the player selectable zone having a prize associated with it.

78. The gaming system of claim 74, wherein the display image is an image of an angler casting a fly, such that the screen image gives a clue to the player as to the player selectable zone having a prize associated with it.

79. The gaming system of claim 74, wherein the display image is an image of a battleship dropping depth charges, such that the screen image gives a clue to the player as to the player selectable zone having a prize associated with it.

80. The gaming system of claim 74, wherein the display image is an image of a battleship firing missiles, such that the screen image gives a clue to the player as to the zone having a prize associated with it.

81. The gaming system of claim 68, wherein clues to player selectable zones having associated prizes are revealed in zones that have been randomly selected by the game control means.

82. The gaming system of claim 68, wherein clues to player selectable zones having associated prizes are displayed in unselected zones.

83. The gaming system of claim 44, wherein the display means is an LCD panel and is arranged to display the game image having a plurality of player selectable zones;

the control means includes player zone selection means includes touch sensors associated with the display means and located such that touching the display means within one of the player selectable zones causes the respective zone to be selected.

84. The gaming system of claim 68 or 83, wherein the display means displays a background image for the game which is a static image.

85. The gaming system of claim 68 or 83, wherein the image is a fixed pattern.

86. The gaming system of claim 68 or 83, wherein the display means displays a background image for the game which is a dynamic image.

87. The gaming system of claim 68 or 83, wherein the image is an animation.

* * * * *